United States Patent
Takase

[19]

[11] Patent Number: 6,148,351
[45] Date of Patent: *Nov. 14, 2000

[54] METHOD FOR DATA WIDTH CONVERSION BETWEEN A DMA CONTROLLER AND AN INTERFACE UNIT WITH A BUS WIDTH THAT IS AN INTEGER MULTIPLE OF THE DMAC BUS WIDTH

[75] Inventor: Hiroshi Takase, Kasugai, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/789,671

[22] Filed: Jan. 27, 1997

[30] Foreign Application Priority Data

Jan. 29, 1996 [JP] Japan .................... 8-013330

[51] Int. Cl.[7] ............................... G06F 13/14
[52] U.S. Cl. ..................... 710/66; 326/30; 710/22; 710/53; 710/127; 710/130
[58] Field of Search ................. 395/842, 872; 710/127, 130, 53, 22, 66; 326/30

[56] References Cited

U.S. PATENT DOCUMENTS

| | | | |
|---|---|---|---|
| 4,309,754 | 1/1982 | Dinwiddle, Jr. | 710/127 |
| 4,450,370 | 5/1984 | Davis | 326/30 |
| 4,451,891 | 5/1984 | Baba | 701/115 |
| 4,663,732 | 5/1987 | Robinson | 364/900 |
| 4,683,534 | 7/1987 | Tietjen et al. | 710/127 |
| 4,716,527 | 12/1987 | Graciotti | 710/127 |
| 4,748,426 | 5/1988 | Stewart | 333/22 R |
| 4,788,693 | 11/1988 | Bays et al. | 375/260 |
| 4,866,309 | 9/1989 | Bonke et al. | 326/57 |
| 5,120,909 | 6/1992 | Kutz et al. | 178/63 R |
| 5,297,242 | 3/1994 | Miki | 395/425 |
| 5,313,595 | 5/1994 | Lewis et al. | 710/126 |
| 5,345,559 | 9/1994 | Okazaki et al. | 710/127 |
| 5,381,034 | 1/1995 | Thrower et al. | 257/529 |
| 5,382,841 | 1/1995 | Feldbaumer | 326/30 |
| 5,422,580 | 6/1995 | Mandel et al. | 326/30 |
| 5,434,516 | 7/1995 | Kosco | 326/30 |
| 5,448,521 | 9/1995 | Curry et al. | 365/189.02 |
| 5,548,786 | 8/1996 | Amini et al. | 395/842 |
| 5,841,995 | 11/1998 | Ogawa | 710/129 |

FOREIGN PATENT DOCUMENTS

| | | |
|---|---|---|
| 0 187 293 | 7/1986 | European Pat. Off. . |
| 0 403 117 | 12/1990 | European Pat. Off. . |
| 4318612 | 11/1992 | Japan . |

OTHER PUBLICATIONS

Intel® 8244A/8255A–5 Programmable Peripheral Interface Manual, pp. 3–100–3–123, 1987.

*Primary Examiner*—Thomas C. Lee
*Assistant Examiner*—Albert Wang
*Attorney, Agent, or Firm*—Staas & Halsey LLP

[57] ABSTRACT

A protocol controller connected between a SCSI device and a DMA controller. The SCSI device is connected to the protocol controller with a first bus and the DMA controller is connected to the protocol controller with a second bus having a width less than a width of the first bus. The protocol controller communicates with the SCSI device so that it transfers data having a width equivalent to the width of the second bus. Other data concurrently transferred by the SCSI device over the first data bus is ignored and not transferred to the DMA controller.

10 Claims, 3 Drawing Sheets

Fig.1 （従来技術）
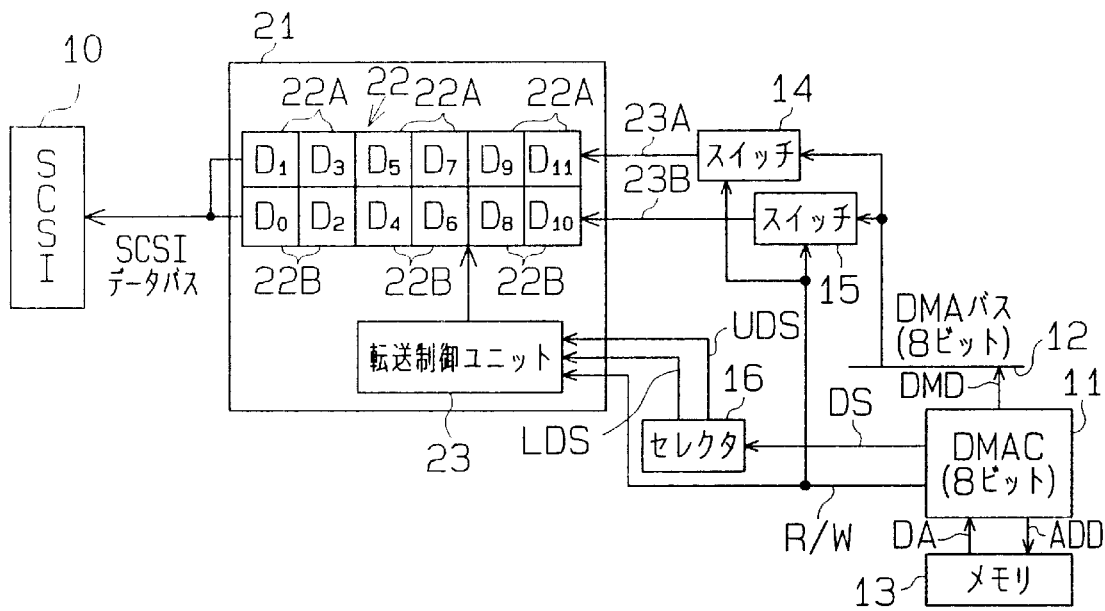
Fig.2 （従来技術）
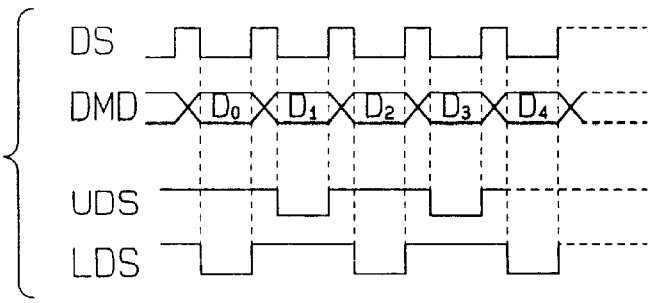

Fig.3 (従来技術)
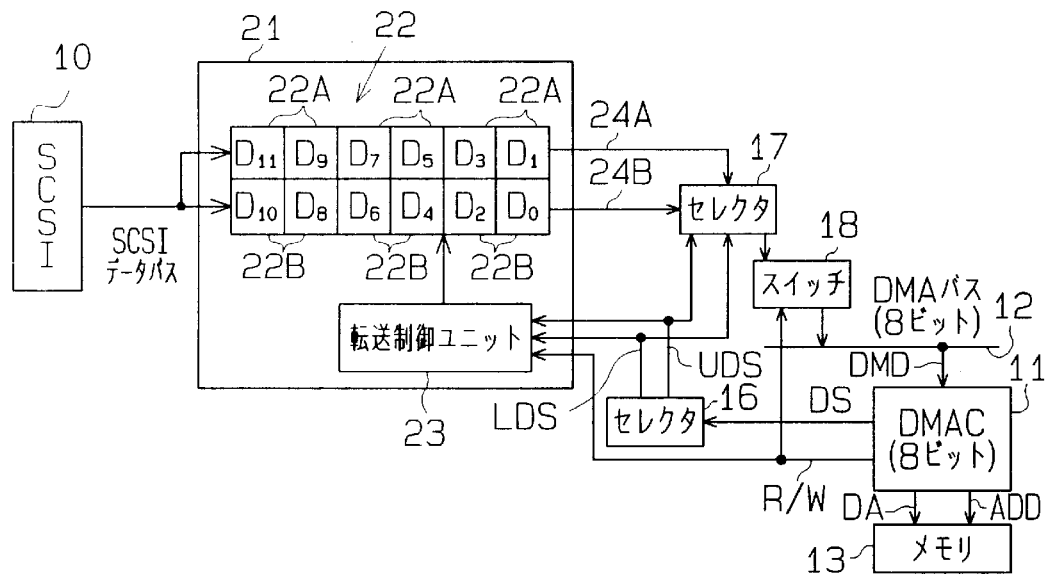
Fig.4 (従来技術)
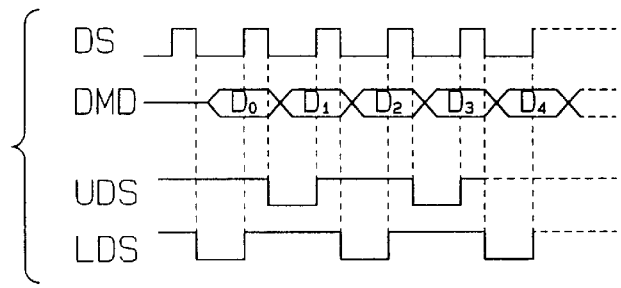

METHOD FOR DATA WIDTH CONVERSION BETWEEN A DMA CONTROLLER AND AN INTERFACE UNIT WITH A BUS WIDTH THAT IS AN INTEGER MULTIPLE OF THE DMAC BUS WIDTH

BACKGROUND OF THE INVENTION

1. Field of the Invention

The present invention relates to a data transfer method, and, more particularly, to a system and method for data transfer between a direct memory access controller (DMAC) and an interface unit that has a wider bus width than the data bus width of the DMAC.

2. Description of the Related Art

Information apparatuses, such as personal computers and hard disk units, incorporate a small computer system interface (SCSI) unit and a DMAC provided between the SCSI unit and a memory device. Further, a SCSI protocol controller (SPC) for controlling the SCSI is provided between the SCSI unit and the DMAC. It is preferable that the bus width of this SPC be set to an integer multiple of the current bus width in consideration of the number of bits of transfer data, which is likely to be increased in the future. For example, an SPC capable of transferring 8-bit data and 16-bit data between the SCSI unit and the DMAC is used.

FIG. 1 shows a conventional data transfer system in a reading system of reading data from a memory 13. The reading system uses a DMAC 11, an SPC 21, two switch circuits 14 and 15 each incorporating eight switches (not shown), and a selector 16.

The DMAC 11 sends an address signal ADD to the memory 13 to read 8-bit data DA from the memory 13. The read data DA is output as data DMD on a DMA bus 12, which has a bus width of eight bits. The DMAC 11 further sends a read/write signal R/W to the switch circuits 14 and 15 and the SPC 21 and sends a select signal DS (see FIG. 2) to the selector 16.

The SPC 21 has eight upper data input terminals 23A connected to the DMA bus 12 via the respective eight switches of the switch circuit 14, eight lower data input terminals 23B, which are connected to the DMA bus 12 via the respective eight switches of the switch circuit 15, and an output terminal connected to the SCSI data bus, which has an 8-bit bus width. In response to the read/write signal R/W having a low (L) level, the switch circuits 14 and 15 are turned on to permit 8-bit data DMD on the DMA bus 12 to be transferred to the data input terminals 23A and 23B respectively.

The SPC 21 includes a data register 22, which comprises a plurality of upper data registers 22A and a plurality of lower data registers 22B, and a transfer control unit 23. The upper data registers 22A receive and temporarily store 8-bit data DMD via the upper data input terminals 23A. The lower data registers 22B receive and temporarily store 8-bit data DMD via the lower data input terminals 23B.

The selector 16 alternately sends an upper select signal UDS and a lower select signal LDS to the transfer control unit 23 in accordance with the select signal DS (see FIG. 2). In response to both the read/write signal R/W and the upper select signal UDS having Low (L) levels, the transfer control unit 23 controls the data register 22 in such a way as to store the transfer data DMD into the upper data registers 22A. In response to both the read/write signal R/W and the lower select signal LDS having L levels, the transfer control unit 23 controls the data register 22 in such a manner as to store the transfer data DMD into the lower data registers 22B. In this manner, the DMAC 11, which is designed for eight bits, can be used to transfer 16-bit read data to a SCSI 10 from the DMAC 11.

FIG. 3 shows a conventional data transfer system in a writing system for writing data into the memory 13. FIG. 4 is a time chart illustrating the write operation. This writing system uses the DMAC 11, the SPC 21, two selectors 16 and 17 and a switch circuit 18. The upper and lower data registers 22A and 22B are connected to the selector 17 via the upper and lower data output terminals 24A and 24B. In accordance with the upper and lower select signals UDS and the LDS output from the selector 16, the selector 17 alternately selects the upper and lower data output terminals 24A and 24B to supply 8-bit data from the selected output terminals to the switch circuit 18.

In response to the read/write signal R/W having a high (H) level and the upper select signal UDS having an L level, the transfer control unit 23 controls the data register 22 to store the data, supplied via the SCSI data bus from the SCSI 10, into the upper data registers 22A. The data stored in the registers 22A are transferred as data DMD to the DMAC 11 via the upper data output terminals 24A, the selector 17, the switch circuit 18 and the DMA bus 12.

In response to the read/write signal R/W having an H level and the lower select signal LDS having an L level, the transfer control unit 23 controls the data register 22 to store data into the lower data registers 22B. The data stored in the registers 22B are transferred as data DMD to the DMAC 11 via the lower data output terminals 24B, the selector 17, the switch circuit 18 and the DMA bus 12. In this manner, the DMAC 11 sends the address signal ADD to the memory 13 to write upper and lower data DMD, each consisting of eight bits. Accordingly, it is possible to transfer 16-bit write data to the DMAC 11 from the SCSI 10.

The use of the switch circuits 14 and 15, the selectors 16 and 17 and the switch circuit 18 to transfer 16-bit data between the SCSI 10 and the DMAC 11 increases the number of components and their occupying area on the system board. This inevitably leads to an increase in the cost of the transfer system and enlargement of the system.

SUMMARY OF THE INVENTION

Accordingly, it is the primary objective of this invention to provide a method and system which perform simple data transfer between a direct memory access controller and an interface unit while permitting the system to be more compact.

One embodiment of the invention pertains to a data transfer method using a direct memory access controller having a plurality of first bus lines having a first bus width and an interface unit having a plurality of second bus lines having a second bus width which is greater than the first bus width. The method includes the steps of: (1) connecting sub bus lines of the second bus lines (the sub bus lines corresponding in number to the first bus lines) to the first bus lines, (2) connecting a predetermined voltage to other bus lines in the second bus lines, excluding the sub bus lines connected to the first bus lines, via a resistor element; and (3) transferring data between the direct memory access controller and the interface unit using the first bus lines and the sub bus lines.

In the method of one embodiment, the second bus lines may respectively correspond to data from upper bit data to lower bit data, and the sub bus lines may correspond to data consisting of a plurality of bits including a least significant bit. The second bus width may be set to an integer multiple of the first bus width. Furthermore, the data transfer step may include a step of transferring data the number of bytes of which is an integer multiple of the number of data bytes transferable by the direct memory access controller.

In another embodiment of the invention, a data transfer system includes a direct memory access controller having a plurality of first bus lines which have a first bus width, and an interface unit having a plurality of second bus lines which have a second bus width greater than the first bus width. The sub bus lines of the second bus lines, which correspond in number to the first bus lines, are connected to the first bus lines. The system also includes a resistor element connected between a predetermined voltage and other bus lines in the second bus lines excluding the sub bus lines connected to the first bus lines. The first bus lines and the sub bus lines are used for transferring data between the direct memory access controller and the interface unit.

In the system of another embodiment, The second bus lines may respectively correspond t o data from upper bit data to lower bit data, and the sub bus lines may correspond to data consisting of a plurality of bits including a least significant bit. The second bus width may be set to an integer multiple of the first bus width. Furthermore, the first bus lines and the sub bus lines may be used for transferring data the number of bytes of which is an integer multiple of the number of data bytes transferable by the direct memory access controller.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings in which:

FIG. 1 is a block diagram showing a conventional data transfer system used for data transfer in a reading system;

FIG. 2 is a time chart illustrating the read operation in the system in FIG. 1;

FIG. 3 is a block diagram showing a conventional data transfer system used for data transfer in a writing system;

FIG. 4 is a time chart illustrating the write operation in the system in FIG. 3;

DETAILED DESCRIPTION OF THE PREFERRED EMBODIMENT

Figure 5:
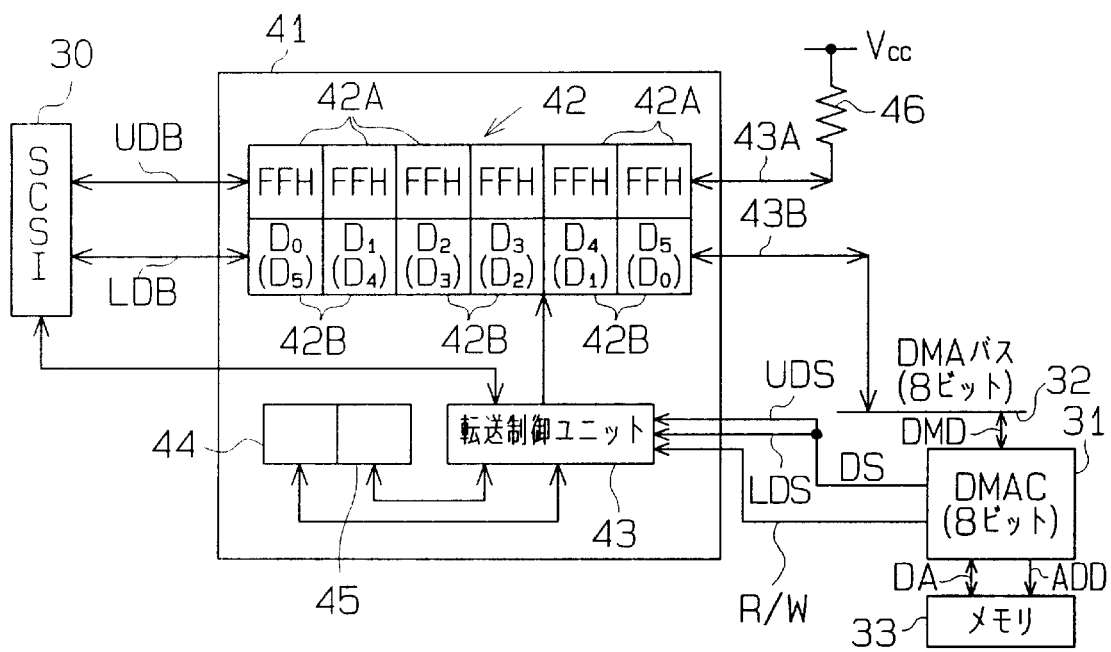
FIG. 5 is a block diagram of a data transfer system according to one embodiment of this invention.

A data transfer system according to one embodiment of the present invention will now be described referring to the accompanying drawings. FIG. 5 illustrates a data transfer system adapted for use in an information apparatus, such as a personal computer or a hard disk unit. This data transfer system includes a SCSI 30, a SPC 41 as an interface unit, and a DMAC 31. The SPC 41 includes a data register 42, a transfer control unit 43, a transfer width register 44 and a byte number register 45.

Figure 6A:
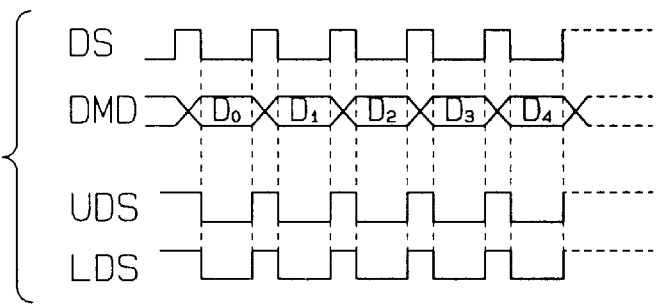
FIG. 6A is a time chart illustrating the read operation in the system in FIG. 5.
Figure 6B:
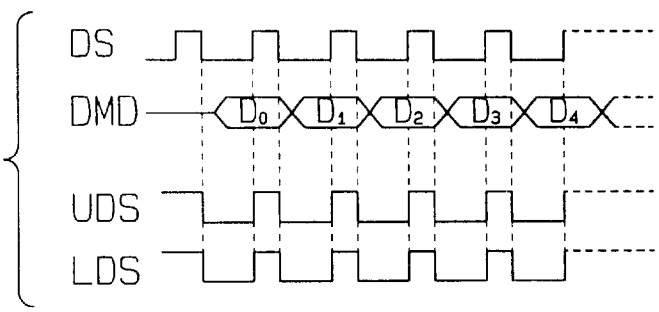
FIG. 6B is a time chart illustrating the write operation in the system in FIG. 5.

The DMAC 31 sends an address signal ADD to the memory 33 to read and write 8-bit data DA from and to the memory 33. The data DA read from the memory 33 is output as data DMD on a DMA bus 32, which has an 8-bit bus width. The DMAC 31 further supplies a read/write signal R/W to the transfer control unit 43 of the SPC 41 and supplies a select signal DS, which serves as both an upper select signal UDS and a lower select signal LDS as shown in FIGS. 6A and 6B, to the transfer control unit 43.

The SPC 41 has an upper data input/output terminal 43A connected to a high-potential power supply $V_{cc}$ having a predetermined voltage via a terminating resistor 46, and a lower data input/output terminal 43B connected to the DMA bus 32. The data input/output terminals 43A and 43B each comprise eight terminals (not shown) and thus have a total bus width that is greater by an integer multiple (two times in this embodiment) than the bus width of the DMA bus 32; that is, the total bus width is 16 bits in this embodiment. Specifically, the lower data input/output terminal 43B has a bus width equivalent to the width of the 8-bit DMA bus 32, which includes the least significant bit. In other words, the lower data input/output terminal 43B has a bus width equivalent to the bus width of the 8-bit DMA bus 32.

The data register 42 comprises a plurality of upper data registers 42A, which are connected between the upper data input/output terminal 43A and an SCSI upper data bus UDB, for storing 8-bit data, and a plurality of lower data registers 42B, which are connected between the lower data input/output terminal 43B and an SCSI lower data bus LDB, for storing 8-bit data.

The transfer width register 44 stores data associated with the transfer width of transfer data. Transfer width data is determined by the protocol processing between the transfer control unit 43 and the SCSI 30 and is supplied to the transfer width register 44 from the transfer control unit 43. When data transfer using the SCSI lower data bus LDB having an 8-bit bus width is determined between the transfer control unit 43 and the SCSI 30, for example, transfer width data "8" is stored in the transfer width register 44.

The byte number register 45 stores data about the number of bytes of transfer data. Byte number data is determined by the protocol processing between the transfer control unit 43 and the SCSI 30 and is supplied to the byte number register 45 from the transfer control unit 43. When the transfer of 8-bit data is determined between the transfer control unit 43 and the SCSI 30, for example, byte number data "1" is stored in the byte number register 45.

In a 16-bit read transfer mode, the transfer control unit 43 controls the data register 42 to store dummy data "FF H" (H indicates a hexadecimal number) into the upper data registers 42A in accordance with both the read/write signal R/W and the upper select signal UDS having L levels. In accordance with both the read/write signal R/W and the lower select signal LDS having L levels, the transfer control unit 43 controls the data register 42 in such a manner as to store data DMD, which is read on the DMA bus 32, into the lower data registers 42B.

In an 8-bit read transfer mode, when transfer width data is set to "8" and byte number data is set to "1", the transfer control unit 43 controls the data register 42 to store read data DMD into the lower data registers 42B in accordance with the L-level select signal DS. As a result, the read data is supplied onto the SCSI lower data bus LDB. At this time, the SCSI lower data bus LDB corresponds to the low active. Therefore, the logic of data to be supplied onto th e SCSI lower data bus LDB from the lower data registers 42B is inverted.

In the 16-bit read transfer mode, the transfer width data is changed to "16" from "8" and the byte number data is changed to "2" (double the normal transfer byte number) from "1". As shown in FIG. 6A, the DMAC 31 outputs the L-level select signal DS in a predetermined period. That is, the upper select signal UDS and the lower select signal LDS, which have L levels and are synchronous with each other, are output in a predetermined period. Accordingly, the read data DMD is stored in the lower data registers 42B and dummy data "FF H" is stored in the upper data registers 42A.

At this time, the SCSI upper and lower data bus UDB and LDB correspond to the low active. Therefore, data "00 H" is supplied onto the SCSI upper data bus UDB from the upper data registers 42A, and data DX (X indicates inversion) is supplied onto the SCSI lower data bus LDB from the lower data registers 42B. The SCSI 30 receives data, transferred via the SCSI lower data bus LDB from the SPC 41 as effective data. In other words, the data "00 H" on the SCSI upper data bus UDB becomes invalid data. The transfer control unit 43 controls the data register 42 in such a manner as to transfer data in units of two bytes in accordance with the byte number data.

In a write mode, the transfer control unit 43 controls the data register 42 to store data, which is transferred from the SCSI 30 via the SCSI upper and lower data buses UDB and LDB, into the upper and lower data registers 42A and 42B in accordance with the H-level read/write signal R/W.

Specifically, in a 16-bit write transfer mode, the transfer width data is changed to "16" from "8", and the byte number data is changed to "2" from "1". 16-bit data is supplied from the SCSI 30 via the SCSI upper and lower data buses UDB and LDB. That is, data DX is supplied via the SCSI lower data bus LDB to the lower data registers 42B from the SCSI 30. Although data is supplied via the SCSI upper data bus UDB to the upper data registers 42A, all data is pulled up by the terminating resistor 46 to be set at "00 H". The SCSI 30 therefore supplies data, which is permitted to be invalid, onto the SCSI upper data bus UDB.

After data is supplied to the data register 42, as show n in FIG. 6B, the L-level select signal DS, i.e., the upper select signal UDS and the lower select signal LDS, which have L levels and are synchronous with each other, are output in a predetermined period, as in the read transfer mode. Accordingly, write data is output on to the DMA bus 32 from the lower data input/output terminal 43B. Data from the up per data input/output terminal 43A is set at "00 H" or unstable. Accordingly, the DMAC 31 receives the write data via the lower data input/output terminal 43B and the DMA bus 32, and operates to store this data into the memory 33.

As data to be supplied onto the SCSI upper data bus UDB is pulled up to be invalid in this embodiment, 16-bit data transfer can be executed only using the SCSI lower data bus LDB. In other words, parts like the switch circuit and selector are unnecessary in 16-bit data transfer using the DMAC 31 having an 8-bit bus width. This allows the data transfer system to be compact and ensures easy data transfer between the SPC 41 and the DMAC 31.

Although only one embodiment of the present invention has been described herein, it should be apparent to those skilled in the art that the present invention may be embodied in many other specific forms without departing from the spirit or scope of the invention. Particularly, it should be understood that the invention may be embodied in the following forms.

The bus width of the SPC is not limited to two times the width of the DMA bus, but may be equal to or greater than three times (integer multiple) the width of the DMA bus. In this case, the DMA bus should be connected to the bus lines of the SPC whose width is equivalent to the width of the DMA bus, while the remaining bus lines of the SPC are connected via a terminating resistor to the power supply $V_{cc}$.

The DMA bus is not limited to have an 8-bit width, but may have a 16-bit width in which case the bus width of the SPC is set equal to or greater than two times the width of the DMA bus.

Therefore, the present examples and embodiments are to be considered as illustrative and not restrictive and the invention is not to be limited to the details given herein, but may be modified within the scope and equivalence of the appended claims.

What is claimed is:

1. A data transfer method using a direct memory access controller having a plurality of first bus lines having a first bus width and an interface unit having a plurality of second bus lines having a second bus width, the second bus lines including lower data bus lines and upper data bus lines, said method comprising the steps of:

connecting said lower data bus lines of said second bus lines to said first bus lines, wherein the lower data bus lines correspond in number to the first bus lines;

connecting a predetermined voltage to said upper data bus lines via a resistor element when the second bus width is an integer multiple greater than the first bus width;

providing invalid data to said upper data bus lines; and transferring effective data, having a width which is an integer multiple of the width of data transferrable by the direct memory access controller, between said direct memory access controller and said interface unit using said first bus lines and said lower data bus lines.

2. The method according to claim 1, wherein said lower data bus lines correspond to data consisting of a plurality of bits including a least significant bit.

3. A data transfer system comprising;

a direct memory access controller having a plurality of first bus lines having a first bus width and generating a read/write signal and a select signal;

an interface unit having a plurality of second bus lines having a second bus width, the second bus lines including upper data bus lines and lower data bus lines connected to said first bus lines, wherein the lower data bus lines correspond in number to the first bus lines; and a resistor element connected between a predetermined voltage and said upper data bus lines, wherein said interface unit includes a transfer control unit connected to said direct memory access controller for providing invalid data to the lower data bus lines in response to the read/write signal and the select signal when the second bus width is greater by an integer multiple than the first bus width, and wherein said transfer control unit transfers effective data, having a width which is an integer multiple of the width of data transferrable by said direct memory access controller, using the first bus lines and the lower data lines.

4. The system according to claim 3, wherein said lower data bus lines correspond to data consisting of a plurality of bits including a least significant bit.

5. A protocol controller for transferring data between a first device and a second device, the protocol controller being connected to the first device by a first bus and to the second device by a second bus, the second device generating a read/write signal and a select signal, the protocol controller comprising:

a lower data input/output terminal, connected to the second bus, for transferring data between the protocol controller and the second device;

an upper data input/output terminal;

a data register for transferring data between the first and second devices, the data register including a plurality of upper data registers and a plurality of lower data registers, wherein the upper data registers are connected between the upper data input/output terminal and a first part of the first bus and the lower data registers are connected between the lower data input/output terminal and a second part of the first bus;

a transfer control unit connected to the first device by way of a bidirectional communication line and determining a transfer data width and a data byte number, the transfer control unit also connected to the second device and receiving the read/write signal and the select signal from the second device;

a transfer width register, connected to the transfer control unit, storing the transfer data width; and a byte number register, connected to the transfer control unit, storing the data byte number;

wherein the transfer control unit, using the transfer data width and the data byte number, controls the transfer of data between the first device and the second device in response to the read/write signal and the select signal from the second device such that when the transfer data width is greater by an integer multiple than a width of the second bus, invalid data transferred from the first device to the protocol controller over the first part of the first bus is not transferred from the protocol controller to the second device and effective data transferred from the first device to the protocol controller over the second part of the first bus is transferred from the protocol controller to the second device in units of the integer multiple.

6. The protocol controller of claim 5, wherein the lower data input/output terminal and the upper data input/output terminal each comprise a plurality of terminals such that the combined number of the terminals is greater by an integer multiple than the bus width of the second bus.

7. The protocol controller of claim 6, wherein the lower data input/output terminal has a number of terminals equal to the width of the second bus.

8. The protocol controller of claim 5, wherein the upper data input/output terminal is connected to a high potential power supply via a resistor.

9. The protocol controller of claim 5, wherein the first device comprises a SCSI device.

10. The protocol controller of claim 9, wherein the second device comprises a DMA controller device.

* * * * *